(12) United States Patent
Heinonen et al.

(10) Patent No.: US 7,009,956 B2
(45) Date of Patent: Mar. 7, 2006

(54) ADDRESS SHARING

(75) Inventors: Tomi Heinonen, Tampere (FI); Antti Forstadius, Tampere (FI); Jarkko Lempiö, Nokia (FI); Mikko Rautiainen, Tampere (FI)

(73) Assignee: Nokia Corporation, Espoo (FI)

( * ) Notice: Subject to any disclaimer, the term of this patent is extended or adjusted under 35 U.S.C. 154(b) by 973 days.

(21) Appl. No.: 10/028,514

(22) Filed: Dec. 20, 2001

(65) Prior Publication Data

US 2002/0105931 A1    Aug. 8, 2002

(30) Foreign Application Priority Data

Dec. 21, 2000    (FI)    .................................. 20002822

(51) Int. Cl.
*H04Q 7/24*    (2006.01)

(52) U.S. Cl. ...................... 370/338; 370/349; 370/401
(58) Field of Classification Search ................ 370/338, 370/349, 401, 352–356, 351
See application file for complete search history.

(56) References Cited

U.S. PATENT DOCUMENTS 5,734,865 A    3/1998    Yu (Continued)

FOREIGN PATENT DOCUMENTS

| EP | 1 017 206 A2 | 7/2000 |
|---|---|---|
| EP | 1 137 238 A2 | 9/2001 |

(Continued)

OTHER PUBLICATIONS

Communication from the Finnish Patent Office dated Jan. 28, 2002 in the Finnish priority application No. FI 20002822.

(Continued)

*Primary Examiner*—Ajit Patel
(74) *Attorney, Agent, or Firm*—Morgan & Finnegan, L.L.P.

(57) ABSTRACT

The invention relates to a method of transmitting a message from a wireless radio-frequency short-range communication network (20) via a gateway (21) to a network (14, 24) external to the communication network (20). The method comprises receiving a first message (41) via a short-range radio link at the gateway from a terminal device (23) of the short-range communication network (20), the first message being addressed to an element (25, 34) external to the short-range communication network, and the first message comprising a network address of said terminal device as a transmitter's address and a first port number as a source port number, the network address of the terminal device being used inside the short-range communication network. The method comprises allocating a second port number to the terminal device, replacing said network address of the terminal device in said first message (41) with the network address of the gateway and the first port number with said second port number, generating the correlation of the network address of the terminal device, the first port number and the second port number and storing said correlation in a memory available to the gateway for identification of the terminal device. The method comprises transmitting the first message from the gateway to the element external to the short-range communication network (20) with said replaced information. The invention also relates to a gateway and to computer software.

36 Claims, 5 Drawing Sheets

U.S. PATENT DOCUMENTS

| | | | |
|---|---|---|---|
| 5,949,760 A * | 9/1999 | Stevens et al. | 370/254 |
| 6,046,992 A * | 4/2000 | Meier et al. | 370/338 |
| 6,058,431 A | 5/2000 | Srisuresh et al. | |
| 6,061,349 A | 5/2000 | Coile et al. | |
| 6,243,379 B1 | 6/2001 | Veerina et al. | |
| 6,400,702 B1 * | 6/2002 | Meier | 370/338 |
| 6,600,734 B1 * | 7/2003 | Gernert et al. | 370/352 |
| 6,680,923 B1 * | 1/2004 | Leon | 370/328 |
| 6,831,896 B1 * | 12/2004 | Lempio et al. | 370/252 |

FOREIGN PATENT DOCUMENTS

| | | |
|---|---|---|
| WO | WO 97/40610 | 10/1997 |

OTHER PUBLICATIONS

PCT Invitation to Correct Defects, International Application No. PCT/FI 01/00951, Jun. 18, 2002, 2 pp.

PCT Communication Relating to the Results of the Partial International Search, International Application No. PCT/FI 01/00951, Jun. 18, 2002, 2 pp.

PCT Patent Family Annex to the Communication Relating to the Results of the Partial International Search, International Application No. PCT/FI 01/00951, Jun. 18, 2002, 1 p.

U.S. Appl. No. 09/614,508, filed Jul. 11, 2000, Lempio et al.

* cited by examiner

ADDRESS SHARING

FIELD OF THE INVENTION

The present invention relates to address sharing. The invention relates particularly, but not necessarily, to sharing an IP address (Internet Protocol) between terminal devices in a wireless short-range communication network and to the integration of two wireless communication networks operating in the same frequency range.

BACKGROUND OF THE INVENTION

Figure 1:
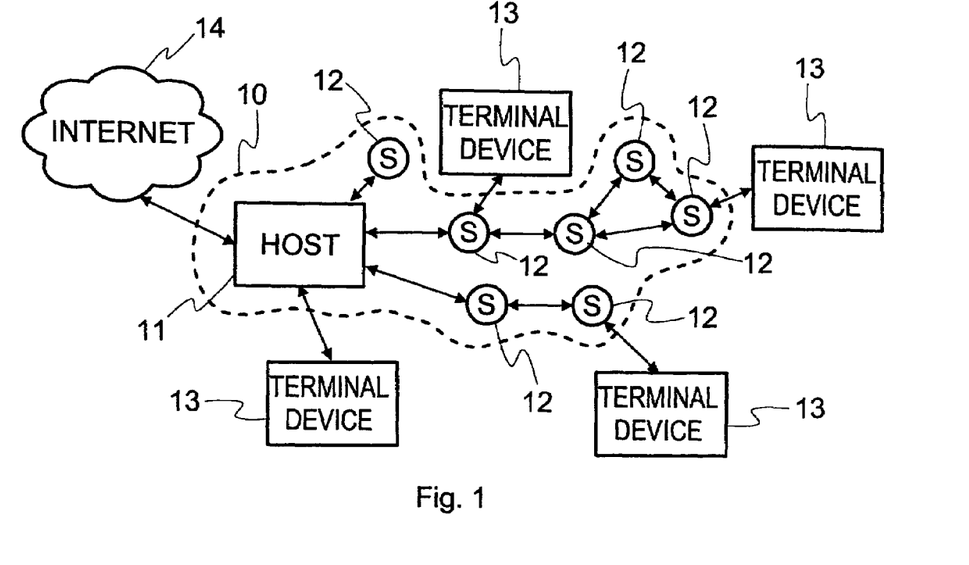
FIG. 1 shows the architecture of a wireless short-range communication network.

U.S. application Ser. No. 09/614,508 (filed 11 Jul. 2000) discloses a wireless short-range communication network. With respect to said communication network, reference is made herein to the same Applicant's international PCT application, which claims priority from said US application. FIG. 1 illustrates the architecture of a communication network. A wireless short-range communication network 10 comprises a host 11 including one or more short-range radio transceivers. In the immediate vicinity of the host 11, the communication network 10 also comprises beacons 12 for extending the operating range of the network 10. Each beacon 12 comprises one or more short-range radio transceivers. A beacon 12 is able to communicate over the radio path with the host 11 by means of its short-range radio transceiver either directly or via another beacon 12. Terminal devices 13, such as mobile stations or portable computers, can connect to the communication network 10. The terminal devices 13 that are connectable to the network 10 each comprise a short-range radio transceiver. If the terminal device 13 is in the operating range of the host 11, it is able to communicate with the host over the radio path directly by means of the short-range transceiver. If the terminal device 13 is not in the operating range of the host 11, but is in the operating range of a beacon 12, it is able to communicate with the host via the beacon. U.S. application Ser. No. 09/614,508 states that said short-range transceivers may be transceivers utilizing the Bluetooth technology and having a range of about 10 meters at normal power.

The host 11 serves as a gateway for the terminal devices 13 to networks external to the communication network, such as the Internet 14. Thus, the host 11, hereinafter referred to as a gateway, provides the terminal devices 13 with an interface for message switching between the communication network 10 and networks external to the communication network.

In order for the gateway to be able to communicate with a network external to the communication network, the gateway has to have an adapter. A commonly used adapter is a network interface card (NIC). However, a network interface card only provides the gateway with one IP address. Thus, the terminal devices in the communication network have to share the IP address of said gateway. In this case, the IP address of the gateway is given as the address of the receiver for example in all messages/packets arriving at the gateway from outside the communication network and intended for terminal devices in the communication network. Thus, the gateway has to have means to identify the terminal device in the communication network for which each message is intended.

SUMMARY OF THE INVENTION

A novel invention is now provided for solving problems known from the prior art. A first aspect of the invention provides a method of transmitting a message from a wireless radio-frequency short-range communication network via a gateway to a network external to the communication network, the method comprising:

receiving a first message via a short-range radio link at the gateway from a terminal device of the short-range communication network, the first message being addressed to an element external to the short-range communication network, and the first message comprising a network address of the terminal device as a transmitter's address and a first port number as a source port number, the network address of the terminal device being a network address that is used inside the short-range communication network.

The method is characterized by further comprising:
allocating a second port number to the terminal device;
replacing the network address of the terminal device in the first message with a network address of the gateway and the first port number with the second port number;
generating a correlation between the network address of the terminal device, the first port number and the second port number and storing said correlation in a memory available to the gateway for identification of the terminal device; and
transmitting the first message from the gateway to the element external to the short-range communication network with the replaced information.

A second aspect of the invention provides a method of transmitting a message from an element external to a wireless short-range radio-frequency communication network via a gateway to a terminal device of the short-range communication network.

The method is characterized by
selecting a first port number for the terminal device;
generating a correlation between a network address of the terminal device, said first port number and a particular second port number, the network address of the terminal device being a network address that is used inside the short-range communication network, and said second port number being intended to identify a right application in the terminal device, and storing said correlation in advance in a memory available to the gateway;
receiving a message at the gateway from the element external to the short-range communication network, the message comprising the network address of the gateway as a receiver's address and said first port number as a destination port number;
replacing the network address of the gateway in the message with the network address of the terminal device and said first port number with the second port number, on the basis of said correlation;
transmitting the message from the gateway to the terminal device of the short-range communication network via a short-range radio link with the replaced information.

A third aspect of the invention provides a gateway for transmitting a message from a wireless radio-frequency short-range communication network via the gateway to a network external to the short-range communication network, the gateway comprising:

a short-range transceiver for receiving a first message at the gateway via a short-range radio link from a terminal device of the short-range communication network, the first message being addressed to an element external to the short-range communication network, and the first message comprising the network address of said terminal device as a transmitter's address and the first port number as a source port number, the network address of the terminal device being a network address used inside the short-range communication network.

The gateway is characterized in that the gateway further comprises:

a processing element for allocating a second port number to the terminal device;

a processing element for replacing the network address of said terminal device in the first message with the network address of the gateway and for replacing the first port number in the first message with the second port number;

a processing element for generating a correlation between the network address of the terminal device, the first port number and the second port number and storing it in a memory available to the gateway for identification of the terminal device;

a transceiver for transmitting the first message from the gateway to the element external to the short-range communication network with the replaced information.

A fourth aspect of the invention provides a gateway for transmitting a message from an element external to a wireless short-range radio-frequency communication network via the gateway to a terminal device of the short-range communication network.

The gateway is characterized in that it comprises:

a processing element for selecting a first port number for the terminal device;

a processing element for generating a correlation between a network address of the terminal device, said first port number and a particular second port number and storing it in advance in a memory available to the gateway, the network address of the terminal device being a network address that is used inside the short-range communication network, and the second port number being intended for identifying a right application in the terminal device;

a transceiver for receiving a message at the gateway from the element external to the short-range communication network, the message comprising the network address of the gateway as a receiver's address and the first port number as a destination port number;

a processing element for replacing the network address of the gateway in the message with the network address of the terminal device and for replacing said first port number in said message with the second port number, on the basis of said correlation;

a short-range radio-frequency transceiver for transmitting the message from the gateway to the terminal device of the short-range communication network via a short-range radio link with the replaced information.

A fifth aspect of the invention provides software executable at a gateway for transmitting a message from a wireless radio-frequency short-range communication network via the gateway to a network external to the short-range communication network, the software comprising:

program code for causing the gateway to receive a first message at the gateway via a short-range radio link from a terminal device of the short-range communication network, the first message being addressed to an element external to the short-range communication network and the first message comprising a network address of said terminal device as a transmitter's address and a first port number as a source port number, the network address of the terminal device being a network address used inside the short-range communication network.

The software is characterized in that it comprises:

program code for allocating a second port number to the terminal device;

program code for replacing the network address of said terminal device in the first message with the network address of the gateway and for replacing the first port number in the first message with the second port number;

program code for generating a correlation between the network address of the terminal device, the first port number and the second port number and storing it in a memory available to the gateway for identifying the terminal device;

program code for causing the terminal device to transmit the message (41) from the gateway to the element external to the short-range communication network with the replaced information.

A sixth aspect of the invention provides software executable at a gateway for transmitting a message from an element external to a wireless short-range radio-frequency communication network via the gateway to a terminal device of the short-range communication network.

The software is characterized in that it comprises:

program code for selecting a first port number for the terminal device;

program code for generating a correlation between the network address of the terminal device, said first port number and a particular second port number and for storing it in advance in a memory available to the gateway, the network address of the terminal device being a network address used inside the short-range communication network, and said second port number being intended to identify the right application in the terminal device;

program code for causing the gateway to receive a message at the gateway from the element external to the short-range communication network, the message comprising the network address of the gateway as a receiver's address and said first port number as a destination port number;

program code for replacing the network address of the gateway in said message with the network address of the terminal device and for replacing said first port number in said message with the second port number, on the basis of said correlation;

program code for causing the gateway to transmit the message from the gateway to the terminal device in the short-range communication network via a short-range radio link with the replaced information.

In an embodiment of the invention, the gateway is the gateway of a wireless short-range radio-frequency communication network. The terminal device may be either mobile or stationary, such as a mobile telephone, a computer, a portable computer, a coffee maker or a sauna stove comprising a short-range transceiver. The short-range transceiver is preferably a Bluetooth transceiver. Alternatively, the short-range transceiver may be another short-range radio-frequency transceiver.

According to an embodiment of the invention, the port number is used in the traffic between the short-range communication network and a network external to the short-range communication network for the identification of terminal devices. Said external network is an IP-based network, such as a WLAN network (Wireless Local Area Network), an Ethernet local area network or the Internet. In a preferred embodiment of the invention, the gateway is provided for connecting a Bluetooth network (short-range communication network) and a WLAN network operating in the same frequency range. The interference between the Bluetooth and WLAN networks is preferably reduced by placing the interfering antennas of the different systems at a distance from each other and by using a directional antenna. The memory available to the gateway can be located at the gateway or outside the gateway. If located outside the gateway, it is arranged in a telecommunication connection with the processor of the gateway for example with a cable or a wireless connection, such as a radio connection or another electromagnetic connection or an infrared connection.

BRIEF DESCRIPTION OF THE DRAWINGS

In the following, the invention will be described in detail with reference to the accompanying drawings, in which.

DETAILED DESCRIPTION

Figure 2:
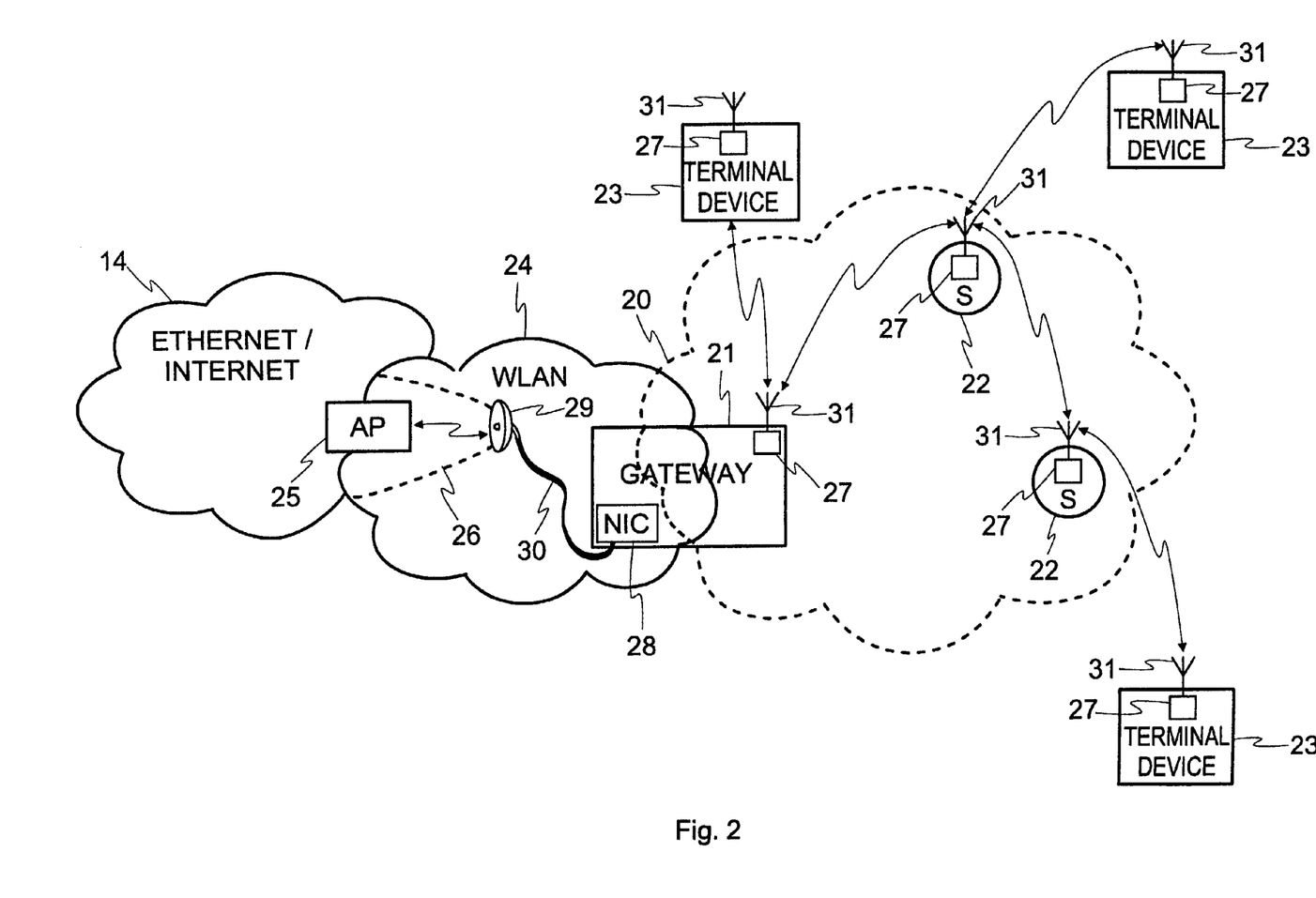
FIG. 2 shows the architecture of a short-range communication network in view of the preferred embodiment of the invention.

FIG. 1 was explained above in connection with the description of the background of the invention. FIG. 2 shows the architecture of a wireless short-range communication network in view of the preferred embodiment of the invention. FIG. 2 shows a wireless short-range communication network 20, which is largely similar to the communication network 10 shown in FIG. 1. The communication network 20 comprises a gateway 21 comprising one or more short-range radio transceivers 27. In the preferred embodiment of the invention, said radio transceivers are Bluetooth transceivers, which have an operating range about 10 meters at normal transmission power. With the use of a higher transmission power, the range may be as much as about 300 meters. Near the gateway 21, the communication network 20 may comprise one or more beacons 22 for expanding the operating range of the communication network. The distance between two adjacent beacons or a beacon and the gateway is some meters. The beacons 22 comprise one or more short-range radio transceivers 27, which in the preferred embodiment of the invention are Bluetooth transceivers. The beacon 22 communicates over the radio path with a host 21 by means of its short-range radio transceiver either directly or via another beacon. The gateway 21 and the beacons 22 communicate by means of a suitable protocol. Communication may take place for example using a proprietary protocol based on the IP protocol over a Bluetooth connection.

The communication network 20 may be installed for example in an office, an airport or a person's home, and it can be called a WPAN network (Wireless Personal Area Network). One or more terminal devices 23 may connect to the communication network 20. Each terminal device 23 comprises a short-range radio transceiver 27, such as a Bluetooth transceiver. The terminal device 23 may be almost any device comprising a short-range transceiver, such as a mobile station, a computer, a portable computer, a video device or even a coffee maker or sauna stove provided with a Bluetooth transceiver. The terminal device 23 is able to communicate with the gateway 21 either directly or via one or more beacons 22. The beacons serve to expand the operating range of the short-range communication network 20.

The gateway 21 provides the terminal devices 23 connected to the communication network 20 with an interface for message switching between the communication network and networks external to the communication network. For this purpose, the gateway comprises a network card 28 as an adapter. In the preferred embodiment of the invention, the nearest external network, to which the gateway 21 provides a connection by means of its network card 28, is a wireless local area network, i.e. a WLAN network 24. Correspondingly, the network card comprised by the gateway is called a WLAN network card. The WLAN network 24 may be a part of the Internet 14, which is a global network of interconnected computer networks.

The WLAN network card 28 of the gateway 21 comprises a radio transceiver operating according to the WLAN technology. An antenna 29 is coupled to the radio transceiver. Attachment to the WLAN network may be effected by two different methods. In the first method (Ad-Hoc network), the WLAN network 24 is composed of the WLAN network card 28 of the gateway 21 and a second WLAN network card 25 (WLAN access point) with antennas. The WLAN network cards 25 and 28 are equal, i.e. neither of the network cards is the other's master or slave. The WLAN network may also comprise other WLAN network cards. Said second WLAN network card 25 is coupled for example via an Ethernet network card (not shown in FIG. 2) by a wired connection to an Ethernet local area network. The Ethernet local area network is coupled for example via a suitable gateway (not shown in FIG. 2) to the Internet. This way said second WLAN network card 25 implements a sort of an access point to the Ethernet local area network and to the Internet.

In the second method (Infrastructure Mode), the WLAN access point 25 is also a WLAN network card, but it now clearly constitutes as a master. The WLAN network card 28 of the gateway constitutes as a slave. Irrespective of the method used, the WLAN access point 25 and the WLAN network card 28 of the gateway 21 are elements that can be considered parts constituting the WLAN network. There is preferably a wired connection to the Internet from the WLAN network card 25 implementing the WLAN access point. Alternatively, the WLAN network card implementing the WLAN access point is a local server. A HTTP server (HyperText Transfer Protocol) located in (a company's internal) Intranet is an example of a local server.

Said second method is preferably used in the attachment to the WLAN network 24.

Bluetooth and WLAN technologies both operate in the 2.4 GHz frequency range. If the communication network 20 utilizes Bluetooth technology, the Bluetooth and WLAN transceivers interfere with each other to some degree. Interference can be reduced by placing the antenna 29 of the WLAN transceiver of the gateway at a distance from antennas 31 of Bluetooth transceivers 27 at the gateway. The antennas 31 of the Bluetooth transceivers are typically integrated into the transceiver. Alternatively, they may be external antennas. The antenna of the WLAN transceiver is preferably disposed at a distance of some meters from the Bluetooth transceivers at the gateway and other Bluetooth transceivers in the communication network 20. A 50-ohm coaxial cable 30 can be used for this purpose. The coaxial cable may be some meters long (e.g. 3 or 5 meters long). Its one end is connected to the WLAN transceiver of the WLAN network card 28 and the other end to the antenna 29 of the WLAN transceiver. The coaxial cable 30 attenuates strongly a 2.4-GHz signal. If the WLAN antenna 29 is to be disposed longer than 10 meters away from the gateway, it may be necessary to cut the coaxial cable 30 into two shorter bits and to adapt a signal amplifier at the junction of the bits.

Alternatively, the entire WLAN network card 28 and its WLAN transceivers and antennas 29 can be placed in a separate device at a distance from the gateway 21 and connect the WLAN network card to the gateway with a data cable or a fibre optic link. Hereby the distance between the antenna 29 of the WLAN transceiver and the antennas 31 of the Bluetooth transceivers at he gateway easily becomes longer than ten meters, and interference can be reduced. Furthermore, alternatively, only the WLAN transceiver (a radio-frequency transceiver circuit) and its antennas can be placed in a separate device at a distance from the gateway. The remainder of the WLAN network card entity is placed in the gateway. Data transmission between the parts may still be implemented with data cables or a fibre optic link.

In any case, the use of a directional antenna 29 as the antenna of the WLAN transceiver allows the interference between the Bluetooth and WLAN transceivers to be further reduced. A transmission and reception beam 26 of the antenna of the WLAN transceiver is directed in the direction of the WLAN access point 25 preferably away from the communication network 20. The major part of the power of the signal transmitted by a directional antenna is concentrated into a narrow area, e.g. a 30-degree wide sector. Since, according to the invention, the antenna of the WLAN transceiver is directed towards the WLAN access point and away from the communication network 20, only a small part of the signal power is conveyed to the Bluetooth transceivers of the communication network. Similarly, a directional antenna receives signals efficiently from only a given narrow area. In other words, the antenna of the WLAN transceiver collects only part of the signals transmitted by the Bluetooth transceivers. This way the interference between the Bluetooth and WLAN transceivers is reduced. The antenna on the side of the WLAN access point 25 may also be directional.

As was stated above, the gateway 21 and the beacons 22 each comprise one or more Bluetooth transceivers 27. The gateway 21 and each beacon 22 preferably comprise more than one Bluetooth transceivers. Their antennas 31 are preferably directional antennas that are directed such that they cover the desired transmission and reception sectors, however, such that the transmission and reception beams of the antennas 31 are directed away from the antenna 29 of the WLAN transceiver at the gateway to reduce interference. Alternatively, the antennas of the gateway 21 and the beacons 22 may be omnidirectional. The antennas 31 of the Bluetooth transceivers of the terminal devices 23 are preferably omnidirectional. However, it may be appropriate to implement the antennas of the Bluetooth transceivers of some, particularly stationary, terminal devices, as directional.

Before the gateway 21 is able to provide the terminal devices 23 in the short-range communication network 20 an access to a network external to the communication network, the IP address of its network card has to be configured. In the preferred embodiment of the invention, the IP address is first input manually in the terminal device 23 of the communication network, such as in a mobile telephone, which transfers the IP address to the gateway 21 over a short-range radio link, such as a Bluetooth link. The gateway 21 then configures the WLAN network card 28 using software. If the gateway 21 comprises a keyboard, the IP address may alternatively be input in the gateway manually. Alternatively, the IP address may be configured dynamically. This allows the WLAN access point (when acting as the master), when it so desires, to always give the WLAN network card (the slave) of the gateway a new IP address when a connection is set up between the WLAN network card of the gateway and the WLAN access point.

A terminal device 23 in the operating range of the wireless short-range communication network 20 is able to register in the communication network. When the Bluetooth technology is concerned, the terminal device sets up a connection according to the Bluetooth protocol to the gateway. During registration, the terminal device 23 gives its unique Bluetooth ID number to the gateway 21. The gateway assigns and transmits a virtual IP address to the terminal device. The gateway 21 also allocates, i.e. reserves, a given number of port numbers to the use of the terminal device. The gateway 21 does not transmit information on the port numbers to the terminal device 23. The gateway 21 is aware of the correspondence between the Bluetooth ID number, the virtual IP address and the port numbers of the terminal device 23. The information can be stored for example in a suitable database (database DB2 (FIG. 5)). The given number of port numbers can be e.g. 30 port numbers.

The IP address received by the terminal device 23 is virtual, since it can be used as the IP address of the terminal device only in the short-range communication network 20. All traffic from the communication network 20 to the outside of the communication network and from outside the communication network to the communication network 20 passes via the gateway 21. Since the network card 28 of the gateway only comprises one IP address, this IP address has to be used in the traffic passing via the gateway 21. This is why the virtual IP address of the terminal device 23 cannot be used as the address of the terminal device outside the communication network 20.

It is known to a person skilled in the art that port numbers are used according to the Internet protocol, TCP/IP protocol (Transmission Control Protocol/Internet Protocol) for determining a software application or a software process. For example, when a given message arrives at a server in the Internet, the server typically directs the message to the right software application or software process based on the port number. The port number is a 16-bit number, so port numbers exist from the number 0 to the number 65535. Port numbers 0 to 1023 are reserved for some privileged services. For example, port number 80 is reserved for HTTP services. Port numbers 1024 to 49151 are so-called registered ports, freely usable by applications. The use of port numbers 49152 to 65535 is forbidden to applications.

According to the preferred embodiment of the invention, port numbers are used in the identification of the terminal devices 23 of the wireless short-range communication network 20 in traffic outwards from the communication network and in traffic from outside the communication network to the communication network. Messages can be transmitted to the terminal devices from outside the communication network 20 based on the port numbers allocated to the terminal devices and the IP address of the gateway. The virtual IP address of the terminal device is used for identifying the terminal device inside the communication network.

Figure 3:
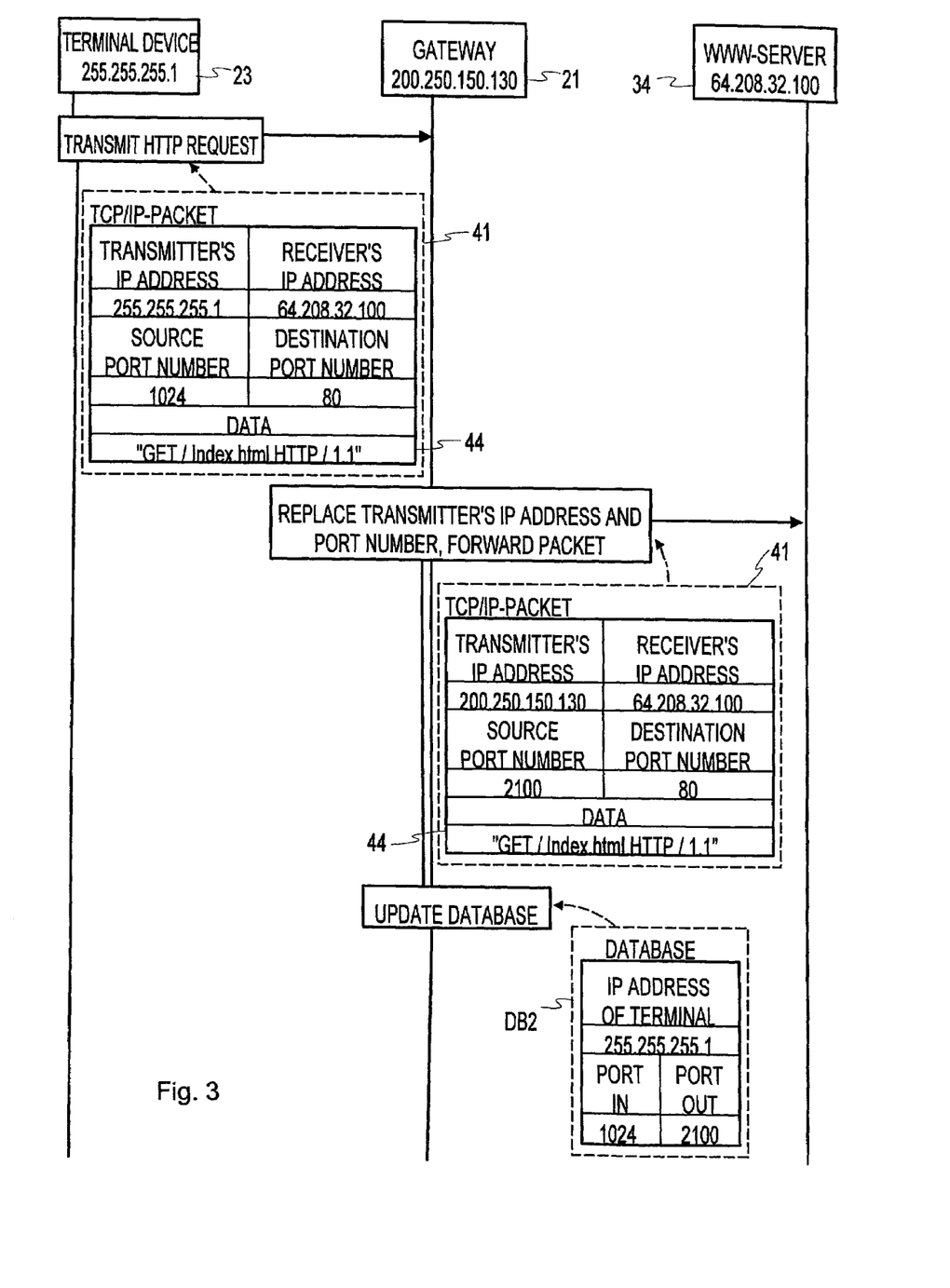
FIG. 3 shows message transmission according to the invention from a wireless short-range communication network.
Figure 4:
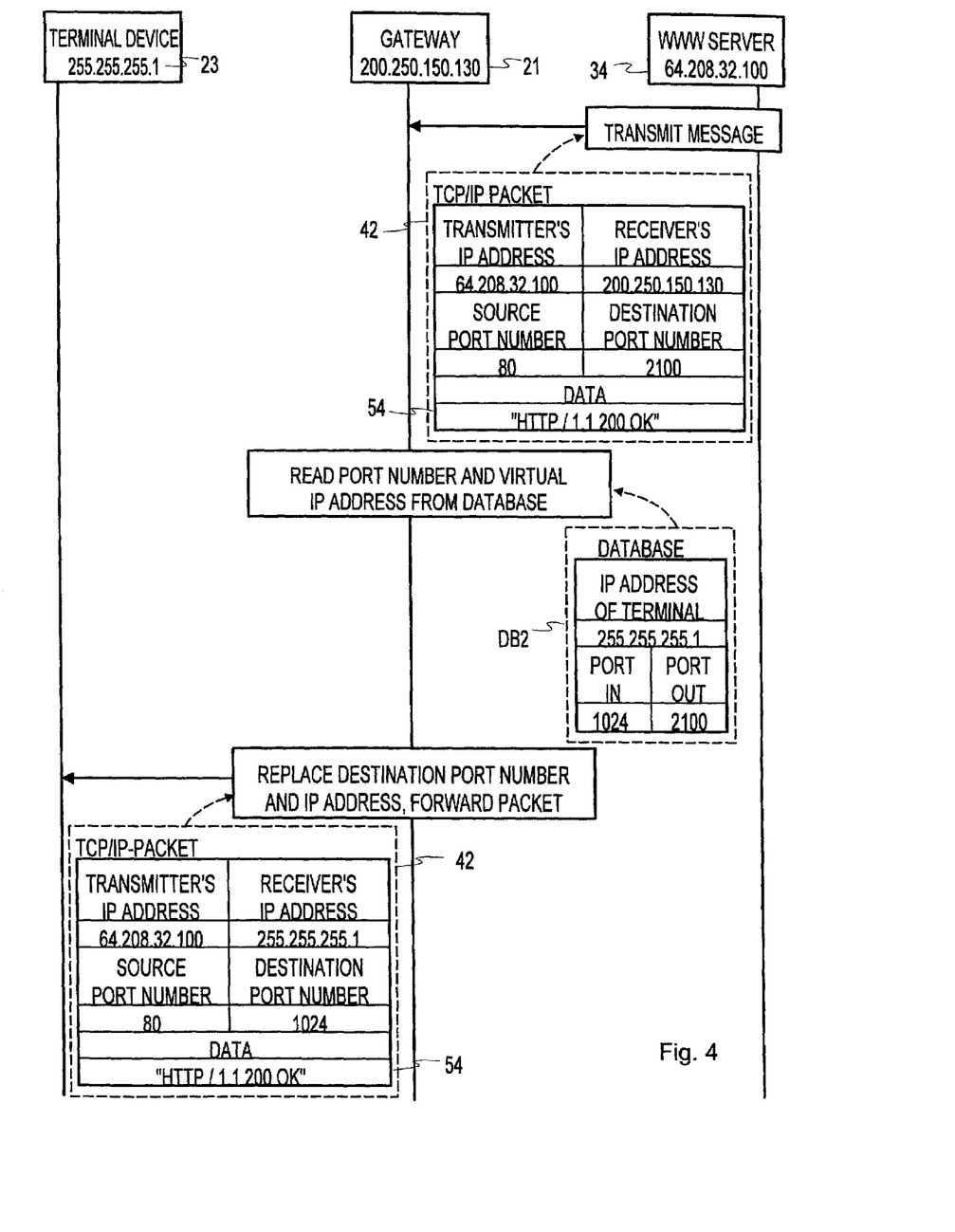
FIG. 4 shows message transmission according to the invention to a wireless short-range communication network.
Figure 5:
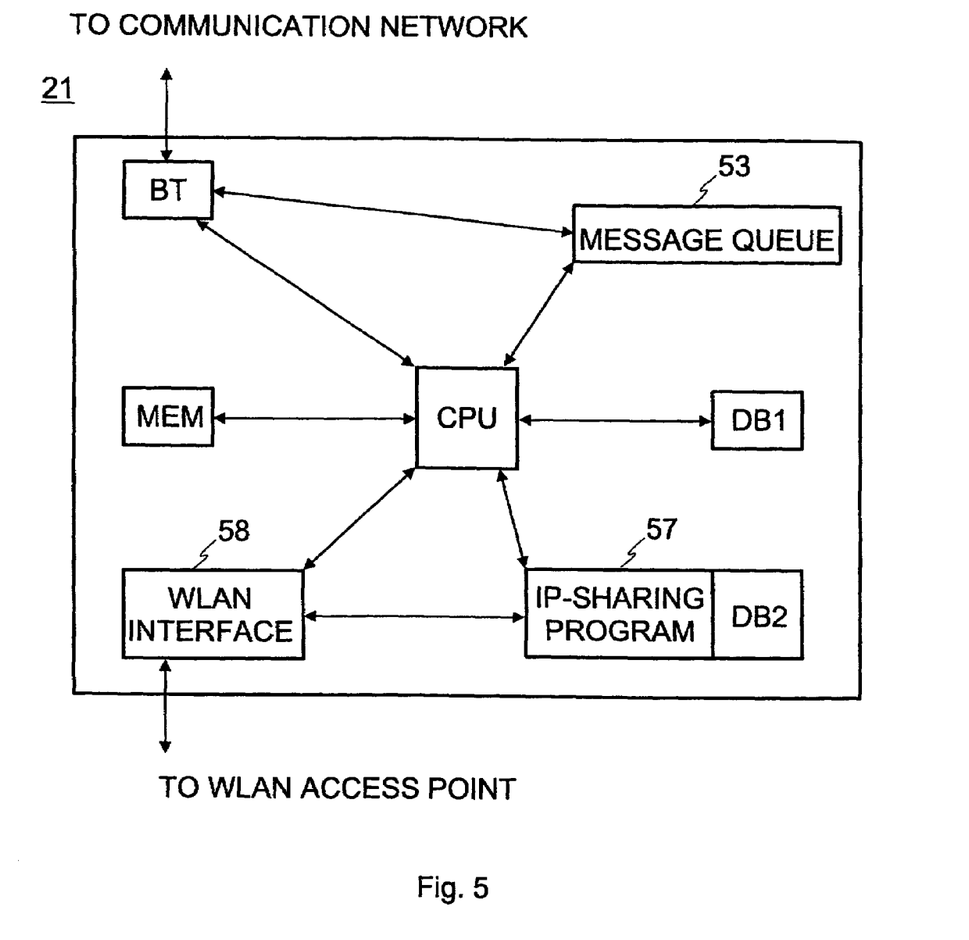
FIG. 5 shows the functional blocks of a gateway applicable to implementing the invention.

With reference to FIGS. 3 and 4, the operation of the invention in connection with the short-range communication network 20 shown in FIG. 2 will be described in detail as follows. Let us assume that a terminal device registered in the communication network 20 wants to retrieve a www (world wide web) page from a www server 34 of the Internet. In the registration process, the gateway 21 assigned and transmitted a virtual IP address 255.255.255.1 to the terminal device 23. Furthermore, in the registration process, the gateway allocated port numbers 2074 to 2103 to the terminal device. The gateway stored said information in its memory in the database DB2 (FIG. 5). The IP address of the gateway 21 is 200.250.150.130 and the address of the www server 34 from where the www page is to be retrieved is 64.208.32.100.

The terminal device 23 now transmits a message 41 to the gateway, and in the message, the receiver's IP address is the www server's IP address 64.208.32.100. In the message 41, the destination port number is port number 80, reserved for the www server (HTTP service). In the message 41, the transmitter's IP address is the virtual IP number 255.255.255.1 of the terminal device, the number having been assigned to the terminal device 23 by the gateway 21 upon registration of the terminal device in the wireless short-range communication network 20. In the message 41, according to the choice of the terminal device 23 or the user, the source port number is one of the port numbers 1024 to 49151 that are freely available to applications. In this exemplary case, the application of the terminal device 23 selected port number 1024 (the first free number) as the source port number. In a message data field 44, there is a request according to the HTTP protocol version 1.1 for retrieving the www page. The message 41 is transmitted to the gateway inside a TCP/IP packet over a Bluetooth connection.

The gateway 21 receives the message and masks the transmitter's IP address 255.255.255.1 with its IP number 200.250.150.130. This is obligatory, since the IP number of the terminal device is virtual and only operates inside the communication network 20. All communication to the outside of the communication network 20 and from outside the communication network to the communication network 20 is carried out by means of the IP address of the network card of the gateway 21. In practice, said masking of the IP address means replacing the IP address with another IP address.

The gateway 21 next masks the source port number 1024 with a port number 1074 to 2103 it has allocated to said terminal device in the registration process. In this exemplary case, the gateway replaces the source port number 1024 with the source port number 2100. The source port number has to be masked, since the original port number 1024 may already be in use on a connection set up by another terminal device. The new port number 2100 is stored, together with the original port number 1024 and the IP address 255.255.255.1 of the terminal device in said gateway database DB2. The port number 2100 is used in due course for identifying the terminal device 23, once a response to the request included in the message 41 arrives at the gateway 21.

FIGS. 3 and 4 show part of the database DB2. At the virtual IP address 255.255.255.1 of the terminal device 23, the source port number that the message 41 contains upon arrival at the gateway is stored in column 'Port In' (FIG. 3), and the source port number that the message 41 contains when it leaves the gateway 21 onwards to the outside of the communication network 20 is stored in column 'Port Out'. In this exemplary case, the source port number 1024 (the source port number selected by the application of the terminal device) is stored in column 'Port In', and the source port number 2100 (the port number allocated by the gateway to the terminal device) is stored in column 'Port Out'. Thus, the database DB2 generates a correlation (association) between the virtual IP address of the terminal device 23, the 'Port In' port number and the 'Port Out' port number.

The gateway 21 forwards the message 41. When leaving the gateway 21, the message 41 (TCP/IP packet) comprises the following parameter values: transmitter's IP address 200.250.150.130 (IP address of gateway), source port number 2100, receiver's IP address 64.208.32.100 and destination port number 80. From the gateway, the message passes via the antenna 29 of the transceiver of the WLAN network card to the WLAN access point 25 in the WLAN network 24.

The message 41 is routed based on the receiver's IP address to the www server 34. Said www server may be located in the WLAN network 24 (local server). It may be located in the same device that implements the WLAN access point 25. However, the www server is preferably located in the Internet 14 outside the WLAN network 24.

The www server 34 receives the message 41 and processes the HTTP request included in the message 41. In this exemplary case, in response to the HTTP request, the www server transmits an acknowledgement '200 OK' and the requested www page in accordance with the HTTP protocol in a message 42 (FIG. 4) to the transmitter of the message 41. The acknowledgement and the www page are sent in a data field 54 in the TCP/IP packet 42. The www page is not shown in FIG. 4 for reasons related to the drawing technique, only the acknowledgement '200 OK' is shown in the data field 54.

The www server 34 transmits the response 42 to the same IP address and to the same port from which it received the request 41. When leaving the www server 34, the message 42 thus comprises the following parameter values: transmitter's IP address 64.208.32.100 (IP address of www server), source port number 80, receiver's IP address 200.250.150.130 (IP address of gateway) and destination port number 2100 (port number allocated to terminal device). The message 42 passes from the www server 34 via the WLAN access point 25 wirelessly via the antenna 29 of the transceiver of the WLAN network card of the gateway to the gateway 21. The gateway picks from the flow of IP packets the packets in which its IP address is given as the receiver's IP address. Hence, it also picks the message 42 transmitted by the www server 34, the message containing the www page requested by the terminal device 23 and said acknowledgement.

Having received the message 42, based on the IP address 200.250.150.130, the gateway 21 reads from the database DB2 to which terminal device 23 said message 42 belongs. It does this based on the destination port number 2100 contained by the message 42. (As we remember, port number 2100 is the new port number with which the gateway masked the original port number 1024 as the HTTP request 41 passed through the gateway.)

The gateway 21 reads from the database DB2 which port number in column 'Port In' and which virtual IP address corresponds to port number 2100 in point 'Port Out'. In this exemplary case, the gateway 21 finds that the 'Port Out' port number 2100 corresponds to the virtual IP address 255.255.255.1 (virtual IP number of terminal device 23) and the 'Port In' port number 1024. The gateway 21 now replaces the receiver's IP address 200.250.150.130 (IP address of gateway) with the IP address 255.255.255.1 of the terminal device and the destination port number 2100 with the port number 1024 of the terminal device. The gateway forwards the message 42 to the terminal device based on its virtual IP address 255.255.255.1, depending on the location of the terminal device 23, either directly or via one or more beacons 22. The terminal device directs the message 42 to the right application based on the destination port number 1024.

In an alternative embodiment of the invention, the gateway 21 assigns and transmits a virtual IP address to the terminal device 23 when the terminal device registers in the communication network 20. However, contrary to the preferred embodiment of the invention, the gateway does not allocate port numbers to the terminal device during the registration process.

With reference to the preferred embodiment of the invention, if the terminal device 23 now transmits the message 41 to the gateway 21 for the retrieval of a www page, then, according to the alternative embodiment of the invention, having received the message 41, the gateway first checks if the source port number 1024 is free. If the port number is free, the gateway leaves the port number 1024 as the source port number in the message 41 and forwards the message 41. In practice, this may be implemented by the gateway masking the 'Port In' port number 1024 with the 'Port Out' port number 1024 using the terms of the database DB2. In other words, in this case, having received the message 41, the gateway 21 allocates port number 1024 to the terminal device and masks the 'Port In' port number 1024 with the allocated 'Port Out' port number 1024.

If the source port number 1024 is not free, the gateway masks port number 1024 with a free port number (i.e. the gateway allocates a free port number to the terminal device and masks port number 1024 with it) before the message 41 is forwarded. Otherwise, the process is similar as described in the preferred embodiment of the invention.

In the alternative embodiment of the invention, the gateway has to keep a record of which source port numbers ('Port Out' port numbers (using the term of the database DB2)) are free at each particular point of time. Thus, the gateway keeps a record in the memory available to the gateway of which port number was last used as the 'Port Out' port number at each particular time.

A port number is free if it has not been used for a given time, e.g. two hours or two days, as the 'Port Out' (source) port number in any message originating from a terminal device in the communication network 20 (excluding messages transmitted by said terminal device).

Thus, the difference between the preferred embodiment and the alternative embodiment of the invention lies in that in the preferred embodiment, all source port numbers are masked irrespective of whether or not the source port number suggested by the terminal device is free, whereas in the alternative embodiment a check is first made to see whether the source port number is free or not, and, if the source port number is free, it is not masked (or is masked with the same port number). In the preferred embodiment, the source port number is always masked with a port number allocated to the terminal device during the registration process. In the alternative embodiment, the same port numbers can be used at different times for masking the source port numbers of messages arriving from different devices.

The software at the gateway 21 sees to it that messages (TCP/IP packets) arriving from different terminal devices 23 in the communication network 20 do not include the same source port number ('Port Out' port number) when leaving the gateway 21 to the outside of the communication network 20. In the preferred embodiment of the invention, this is taken care of automatically, since the gateway allocates different port number for the use of different terminal devices during the registration process. In the alternative embodiment of the invention, this is seen to by keeping a record of free port numbers.

It was described above that the message 41 and the message 42 are transmitted in a TCP/IP packet. Inside the communication network 20, the messages 41 and 42 are transmitted inside a TCP/IP packet over a Bluetooth connection. Alternatively, a proprietary IP-based protocol can be used above the Bluetooth protocol for conveying the request (message 41) and the response (message 42) inside the communication network 20. Alternatively, the request and the response can be transmitted inside an UDP/IP packet (User Datagram Protocol), whereby a WAP protocol (Wireless Application Protocol) is suitable for use above the UDP protocol. The IP protocol is used for communication in the WLAN and the Internet.

The preferred embodiment of the invention is well suitable when there are only a few (a few dozens at most) terminal devices 23 in the communication network 20. In this case, the gateway 21 can always allocate the same port numbers to be used by the same terminal device without any risk of their running out. Thus, if the terminal device 23 leaves the operating range of the communication network 20, but returns to the operating range of the communication network for example after eight hours, the terminal device reregisters in the communication network using its Bluetooth ID number, whereby the gateway 21 allocates the same port numbers again to be used by the terminal device.

The alternative embodiment of the invention is well suitable when several different terminal devices 23 use the communication network 20 at different points of time. Thousands of different terminal devices, but simultaneously perhaps only a few dozens or hundreds, may use a communication network installed for example at an airport at different points of time. If all terminal devices 23 reregistered in the communication network 20 were always given the same port numbers than the previous time, port numbers 1024 to 49151 could quickly run out. This is why the method according to the alternative embodiment of the invention, wherein port numbers are not allocated to terminal devices, but the freeness of a source port number is always checked once a terminal device has transmitted a packet addressed to the outside of the communication network to the gateway for transmission, is suitable for the implementation of a short-range communication network installed at an airport. If the source port number selected by the terminal device is not free and if the intention is to really make sure that the source port number with which the gateway masks the source port number suggested by the terminal device is no longer used by any terminal device, then the "Port Out' port numbers can be reused starting from the oldest', i.e. replace the source port number with a free port number that has been unused the longest.

FIG. 5 shows the functional blocks of a gateway 21 applicable to implementing the invention. It is apparent to a person skilled in the art that the gateway can also be implemented in some other form (e.g. regarding the software) without deviating from the characteristics of the invention. The gateway 21 comprises an operating system stored in a memory MEM at the gateway. As a processing element, the gateway comprises a processor CPU, which may be a microprocessor, micro controller or a digital signal processor DSP. The processor CPU communicates with other units at the gateway 21. The processor CPU controls the operation of the gateway 21 by means of the operating system and other gateway software. The software, i.e. a computer software product, is stored in the memory of the gateway (or a memory/memory means available to the gateway) and it comprises a program code for controlling the gateway when the processor CPU executes said software. The gateway 21 uses a database DB1 to configure and maintain the network of beacons.

The gateway comprises one or more Bluetooth transceivers BT for establishing connections to the terminal devices 23 and the beacons 22. Certain kinds of Bluetooth transceivers BT are able to maintain seven active Bluetooth connections at the same time. Messages to be sent from the gateway 21 to the communication network 20 wait for their transmission turn in a message queue 53, from which they are directed, in turn, to a Bluetooth transceiver BT for transmission. Messages arriving at the gateway 21 from the communication network 20 via a Bluetooth transceiver BT also wait for their processing turn in the message queue 53. The processor CPU controls the operation of the message queue 53 in accordance with the operating system. A Bluetooth transceiver BT comprises an integrated antenna, via which it is able to transmit messages to the beacons 22 and to the terminal devices 23 in the communication network 20 and receive messages from the beacons and from the terminal devices in the communication network in the 2.4-GHz frequency range. Alternatively, the antenna may be an external antenna.

The IP address of the gateway is shared among the different terminal devices 23 by software. In FIG. 5, said part of the computer software is called an IP Sharing application 57. When the gateway transmits the message 41 transmitted by the terminal device 23 of the communication network to the WLAN network, the IP Sharing application 57 replaces the virtual IP addresses of the terminal devices with the IP address of the gateway and subjects the source port number to the measures according to the invention. The IP Sharing application 57 maintains the correlations between the virtual IP addresses of the terminal devices and the port numbers (and Bluetooth ID numbers) in the database DB2. Once the message 42 arrives from outside the communication network 20 to the communication network, the IP Sharing application 57 identifies the terminal device to which the message is intended based on the data in the database DB2.

In the direction of a WLAN interface 58, the IP Sharing application 57 acts as driver software adapting the WLAN interface to cooperation with the other equipment at the gateway. Alternatively, the IP Sharing application 57 can be a normal program process executed by the CPU. The WLAN interface 58 comprises means for the communication of the gateway 21 with the WLAN network 24. The WLAN interface 58 is mainly implemented in the WLAN network card 28. The WLAN network card comprises a WLAN transceiver. An antenna with which the gateway 21 is able to communicate wirelessly with the WLAN access point 25 at the 2.4-GHz frequency range is coupled to the WLAN transceiver. The gateway typically also comprises a user interface (not shown) having a display and a keyboard for inputting information manually in the gateway and for displaying information to the user. The user interface is coupled to the CPU.

In a second alternative embodiment of the invention, the terminal device 23 of the communication network 20 is controlled from outside the communication network 20. In this exemplary case, a person controls the terminal device 23 of the communication network 20 installed in the home by transmitting a message to said terminal device from outside the communication network. In this exemplary case, the terminal device 23 is a sauna stove having a Bluetooth transceiver in connection thereto. More exactly, the Bluetooth transceiver is in a control unit comprised by the stove. The control unit of the stove is connected to a short-range communication network having a gateway. Let us assume that the person is at the office and wants to use the sauna after a hard working day. The person is aware of the Bluetooth ID number of the Bluetooth transceiver of the control unit communicating with the sauna stove. The person also has access to the Internet from a computer at the office. The person is now able to transmit a message to the wireless short-range communication network 20 via the Internet and the WLAN network, the message requesting the control unit of the sauna stove to turn the sauna stove on. The control unit turns the sauna stove on, and the sauna is hot when the person arrives at home.

This embodiment requires that the IP address, Bluetooth ID number, 'Port Out' port number and 'Port In' port number of the control unit of the stove are input and stored in advance in a memory available to the gateway for example manually using the keyboard of the user interface of the gateway. The 'Port Out' port number is the port number based on which the gateway identifies the stove as the terminal device of the control unit to which said message requesting that the control unit of the stove turn on the stove is intended. For example, the user is able to select and input the 'Port Out' port number in the gateway or the gateway is able to select it by software. In the latter case, the user does not have to input the 'Port Out' port number manually in the gateway. The 'Port In' port number is the port number according to which the control unit of the stove controls said message to the right program process in the control unit. In this exemplary case, let the 'Port In' port number be 123, the 'Port Out' port number 1033, the IP address of the control unit of the stove 255.255.255.3 and the IP address of the gateway 200.250.150.130.

In practice, the person first transmits a message from the office from a given application via the Internet and the WLAN 14, 24 to the gateway 21 of the communication network 20, inquiring which port number ('Port Out' port number) the gateway has assigned for the use of the control unit 23 communicating with the sauna stove. In the message, the Bluetooth ID number of the Bluetooth transceiver of the control unit is delivered to the gateway. The gateway 21 checks from the memory in the database DB2 which port number it assigned to the use of the terminal device (control unit of sauna stove) that registered in the communication network using said Bluetooth ID. In response to said message, the gateway transmits the port number 1033 to the person via the WLAN and the Internet. Said port number inquiry may have encryption or authentication measures associated therewith.

Having received the port number 1033 assigned to the control unit 23 of the stove, said application transmits a message via the Internet and WLAN 14, 24 to the gateway 21, the message requesting the control unit of the stove to turn the sauna stove on. In the message, the receiver's IP address is the IP address 200.250.150.130 of the gateway and the destination port number is port number 1033 allocated to the use of the control unit of the stove. Many other devices besides the control unit of the stove may be connected to the short-range communication network. When the gateway now receives the message, it uses the destination port number 1033 to determine that the control unit of the stove is the receiver of the message. The gateway replaces its IP address 200.250.150.130, which was the receiver's IP address in the message, with the IP address 255.255.255.3 of the control unit of the sauna stove and replaces the destination port number 1033 with the port number 123. The gateway then transmits (via the communication network 20) the message to the control unit of the sauna stove. The control unit of the stove receives the message and uses the destination port number 123 to guide the contents of the message to the right program process, which executes the command to turn on the sauna stove.

The present invention is also applicable to other than the WLAN environment. The gateway may be connected, instead of the WLAN access point, by a suitable wired or wireless connection to an access point of a LAN network (Local Area Network) or to an Internet service provider's access point for access to the Internet. Alternatively, the gateway may be connected for example via a modem to a telephone network and from there to the Internet. The gateway of the invention may be implemented for example in a computer, such as a personal computer or a wireless communicator comprising the elements suitable for implementing the invention.

Figure 6:
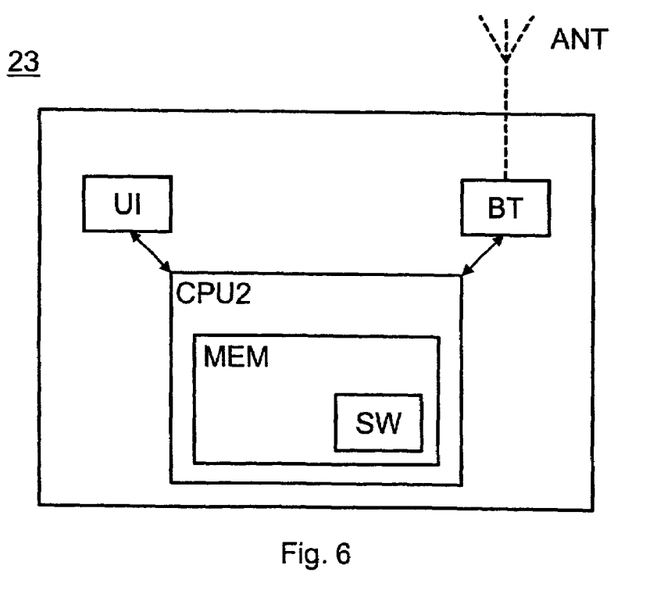
FIG. 6 is a block diagram of a mobile telephone applicable for use in the invention.

FIG. 6 shows a mobile telephone suitable for use in the invention. The mobile telephone 23 comprises processing means CPU2, a Bluetooth transceiver BT and a user interface UI. The Bluetooth transceiver BT and the user interface UI are coupled to the processing means CPU2. The user interface UI comprises a display and a keyboard for using the mobile telephone 23. The processing means CPU2 comprise a microprocessor (not shown in FIG. 6), a memory MEM and software SW. The software SW of the mobile telephone 23 is stored in the memory MEM. The microprocessor uses the software SW to control the operation of the mobile telephone 23, such as the use of the Bluetooth transceiver BT and the display of information at the user interface UI and the reading of inputs received from the user interface UI. The software SW comprises protocol stacks, such as Bluetooth and TCP/IP protocol stacks, according to which the Bluetooth transceiver BT transmits and receives information in accordance with the Bluetooth protocols at the 2.4-GHz frequency range by means of its antenna ANT. The antenna ANT may be an inbuilt antenna integrated into the Bluetooth transceiver. Alternatively, it may be an external antenna ANT (dashed line). The mobile telephone 23 also comprises a radio part having an antenna, a microphone and a speaker (not shown in FIG. 6) for cellular network use.

When registering in the communication network 20, the Bluetooth transceiver BT of the mobile telephone receives a virtual IP address from the gateway 21. The processing means CPU2 store the virtual IP address in the memory MEM of the mobile telephone. The processing means CPU2 use the software SW to generate a message 41 to be transmitted from the terminal device to the outside of the communication network, and include a source port number in the message 41. The Bluetooth transceiver BT transmits the message with its antenna ANT. Furthermore, the processing means CPU2 store the virtual IP address in the memory MEM of the mobile telephone. The processing means CPU2 use the software SW to generate the message 41 to be transmitted from the terminal device to the outside of the communication network and include a source port number in the message 41. The Bluetooth transceiver BT transmits the message with its antenna ANT. Furthermore, the processing means CPU2 process the messages 42 transmitted to the mobile telephone 23 from outside the communication network 20 and whose receiver the gateway 21 has determined to be the terminal device 23, based on the destination port number, and which messages 42 the gateway has thus directed to the mobile telephone over the short-range radio link.

The mobile telephone 23 can be used for configuring the network card of the gateway. In an embodiment of the invention, the user inputs the IP address of the gateway via the keyboard of the user interface UI of the mobile telephone 23 in the mobile telephone, and the Bluetooth transceiver BT transmits the IP address of the gateway over the Bluetooth connection to the gateway 21 for the configuration of the WLAN network card of the gateway.

In one of its forms, the present invention provides a solution to the problem of having to share the same IP address between a number of terminal devices. On the other hand, the invention suggests a solution to how to combine wireless systems having the same frequency, such as Bluetooth and WLAN networks, and how to reduce the interference between them. Since port numbers are already used today in all TCP/IP and UDP/IP packets (although for a different purpose than in the present invention), no changes to the basic structure of existing TCP/IP and UDP/IP packets have to be made when implementing the invention. The compatibility of the invention with the Internet is therefore guaranteed.

In the specification, the implementation and embodiments of the invention were described by means of examples. It is apparent to a person skilled in the art that the invention is not restricted to the details of the above-described embodiments and that the invention may be implemented in another form without deviating from the characteristics of the invention, for example by combining the features of the preferred and alternative embodiments. Thus, the embodiments presented should be considered illustrative, but not restrictive. For example, the gateway 21 may have more than one IP address for the use of the terminal devices 23 in the wireless short-range communication network 20, however, in such a way that the number of the IP addresses of the gateway is limited such that all network terminal devices cannot get an individual IP address. The invention is not either restricted to the details of the gateway database structures described by way of example in the specification.

Thus, the implementation and use of the invention are only restricted by the attached claims. The different alternative embodiments of the invention, including equivalent implementations, fall within the scope of the invention.

The invention claimed is:

1. A method of transmitting a message from a wireless radio-frequency short-range communication network via a gateway to a network external to the communication network, the method comprising:

receiving a first message via a short-range radio link at the gateway from a terminal device of the short-range communication network, the first message being addressed to an element external to the short-range communication network, and the first message comprising a network address of the terminal device as a transmitter's address and a first port number as a source port number, the network address of the terminal device being a network address that is used inside the short-range communication network, wherein the method further comprises:

allocating a second port number to the terminal device;

replacing the network address of the terminal device in the first message with a network address of the gateway and the first port number with the second port number;

generating a correlation between the network address of the terminal device, the first port number and the second port number and storing said correlation in a memory available to the gateway for identification of the terminal device; and transmitting the first message from the gateway to the element external to the short-range communication network, the first message having the network address of the gateway as a transmitter's address and said second port number as a source port number.

2. A method as claimed in claim 1, the method further comprising:
receiving, at the gateway, a particular second message from the element external to the short-range communication network, the second message being transmitted in response to the first message arrived at the element external to the short-range communication network, and the second message comprising the network address of the gateway as a receiver's address and the second port number as a destination port number;
replacing, in the second message at the gateway, based on said correlation, the network address of the gateway with the network address of the terminal device, and replacing the second port number with the first port number;
transmitting the second message from the gateway to the terminal device in the short-range communication network over the short-range radio link.

3. A method as claimed in claim 1, wherein the network address of the terminal device is a virtual address used only inside the short-range communication network.

4. A method as claimed in claim 2, wherein the gateway comprises a network card and the messages are transmitted between the short-range communication network and the network external to the short-range communication network via said network card.

5. A method as claimed in claim 4, wherein the network address of the gateway (21) is an IP address (internet Protocol) and is configured in advance by inputting the IP address in the terminal device of the short-range communication network, by transferring the IP address over a wireless short-range radio-frequency connection from the terminal device to the gateway and by using software to configure the network card based on the IP address received.

6. A method as claimed in claim 2, wherein the messages (41 to 42) are transmitted in at least one of the following packets: TCP/IP packet (Transmission Control Protocol/Internet Protocol), UDP/IP packet (User Datagram Protocol).

7. A method as claimed in claim 1, wherein the method comprises allocating, at the gateway, a particular number of said second port numbers in advance to the terminal device, and in response to the arrival of said first message at the gateway, replacing the first port number in the first message with one of the second port numbers allocated in advance to the terminal device.

8. A method as claimed in claim 7, wherein the particular number of second port numbers are allocated to said terminal device when the terminal device registers in the short-range communication network.

9. A method as claimed in claim 1, wherein the second port number is allocated to the terminal device in response to the arrival of the first message at the gateway, the first port number being replaced with the second port number in said first message.

10. A method as claimed in claim 1, wherein the gateway keeps a record of free port numbers and checks, in response to the arrival of the first message at the gateway, if the first port number in the first message is free.

11. A method as claimed in claim 10, wherein the gateway keeps a record of when each port number was last used as the second port number and concludes that said first port number is free if it has not been used as the second port number during a given period of time in other messages than those originating from said particular terminal device.

12. A method as claimed in claim 11, wherein if the gateway concludes that said first port number is free, it allocates a second port number to the terminal device and replaces said first port number in the first message with said second port number, the second port number being the same as said first port number.

13. A method as claimed in claim 10, wherein in a situation when the first port number in the first message is not free, the gateway allocates a second port number that is free to the terminal device, and replaces the first port number in the first message with said allocated second port number, the second port number being different from the first port number.

14. A method as claimed in claim 10, wherein in a situation when the first port number in the first message is not free, and the gateway has no free second port number, the gateway allocates as the second port number to the terminal device such a port number that has been unused for longest.

15. A method as claimed in claim 1, wherein the gateway takes care that the messages arriving from different terminal devices in the short-range communication network do not have the same source port number when they leave the gateway to the outside of the short-range communication network.

16. A method as claimed in claim 1, wherein the short-range communication network and the nearest network external to the short-range communication network operate in the same frequency range.

17. A method as claimed in claim 16, wherein the short-range communication network is a Bluetooth network and said nearest external network is a WLAN network (Wireless Local Area Network) and that the gateway comprises a WLAN network card for communicating information with a WLAN access point, the WLAN access point comprising an access point to the Internet.

18. A method as claimed in claim 17, wherein the gateway communication with the WLAN access point with a directional antenna to reduce interference between the Bluetooth network and the WLAN network.

19. A method as claimed in claim 17, wherein the gateway comprises a Bluetooth transceiver with antennas and a WLAN transceiver with antennas, the antenna of the WLAN transceiver being a directional antenna, in which method the antenna of the WLAN transceiver is directed away from the antenna of the Bluetooth transceiver at the gateway and towards the WLAN access point to reduce interference between the WLAN transceiver and the Bluetooth transceiver.

20. A method as claimed in claim 19, wherein the antenna of the Bluetooth transceiver at the gateway and the antenna of the WLAN transceiver are placed at a distance from one another to reduce interference.

21. A method as claimed in claim 19, wherein the gateway comprises more than one Bluetooth transceivers with antennas, the antennas of the Bluetooth transceivers being directional antennas that are directed in a different direction than the antenna of the WLAN transceiver.

22. A method as claimed in claim 17, wherein the WLAN network card acts as equal to the other network cards of the WLAN network.

23. A method as claimed in claim 17, wherein the WLAN network card acts as a slave to the network card of the WLAN access point that acts as a master.

24. A method as claimed in claim 1, wherein when the terminal device registers in the wireless short-range radio-frequency communication network, the terminal device assigns a unique Bluetooth identifier to the gateway and receives a virtual IP address from the gateway for use inside the short-range communication network.

25. A method of transmitting a message from an element external to a wireless short-range radio-frequency communication network via a gateway to a terminal device of the short-range communication network, the method comprising selecting a first port number for the terminal device;

generating a correlation between a network address of the terminal device, said first port number and a particular second port number, the network address of the terminal device being a network address that is used inside the short-range communication network, and said second port number being intended to identify a right application in the terminal device, and storing said correlation in advance in a memory available to the gateway;

receiving a message at the gateway from the element external to the short-range communication network, the message comprising the network address of the gateway as a receiver's address and said first port number as a destination port number;

replacing the network address of the gateway in the message with the network address of the terminal device and said first port number with the second port number, on the basis of said correlation;

transmitting the message from the gateway to the terminal device of the short-range communication network via a short-range radio link the message having the network address of the terminal device as a receiver's address and said second port number as a destination port number.

26. A method as claimed in claim 25, wherein the method comprises directing the message received at the terminal device to the right application based on the second port number.

27. A method as claimed in claim 25, wherein the storing is performed at least partly manually.

28. A method as claimed in claim 25, wherein the method comprises also storing a unique identifier of the terminal device in advance in the memory available to the gateway and receiving an inquiry at the gateway from outside said wireless short-range radio-frequency communication network, the inquiry inquiring, based on said unique identifier, about the first port number assigned to the terminal device.

29. A method as claimed in claim 28, wherein the method comprises transmitting said first port number in response to said inquiry to the outside of said wireless short-range radio-frequency communication network.

30. A method as claimed in claim 25, wherein in the method, the terminal device of the wireless short-range radio-frequency communication network is controlled with said message from outside the wireless short-range radio-frequency communication network.

31. A method as claimed in claim 28, wherein the wireless short-range radio-frequency communication network is a Bluetooth network and said unique identifier is a unique Bluetooth identifier.

32. A gateway for transmitting a message from a wireless radio-frequency short-range communication network via the gateway to a network external to the short-range communication network, the gateway comprising:

a short-range transceiver for receiving a first message at the gateway via a short-range radio link from a terminal device of the short-range communication network, the first message being addressed to an element external to the short-range communication network, and the first message comprising the network address of said terminal device as a transmitter's address and the first port number as a source port number, the network address of the terminal device being a network address used inside the short-range communication network, wherein the gateway further comprises:

a processing element (CPU) for allocating a second port number to the terminal device;

a processing element (CPU) for replacing the network address of said terminal device in the first message with the network address of the gateway and for replacing the first port number in the first message with the second port number;

a processing element (CPU) for generating a correlation between the network address of the terminal device, the first port number and the second port number and storing it in a memory available to the gateway for identification of the terminal device;

a transceiver for transmitting the first message from the gateway to the element external to the short-range communication network, the first message having the network address of the gateway as a transmitter's address and said second port number as a source port number.

33. A gateway as claimed in claim 32, wherein said processing element is one of the following: a microprocessor, a micro controller or a digital signal processor.

34. A gateway for transmitting a message from an element external to a wireless short-range radio-frequency communication network via the gateway to a terminal device of the short-range communication network, wherein the gateway comprises:

a processing element (CPU) for selecting a first port number for the terminal device;

a processing element (CPU) for generating a correlation between a network address of the terminal device, said first number and a particular second port number and storing it in advance in a memory available to the gateway, the network address of the terminal device being a network address that is used inside the short-range communication network, and the second port number being intended for identifying a right application in the terminal device;

a transceiver for receiving a message at the gateway from the element external to the short-range communication network, the message comprising the network address of the gateway as a receiver's address and the first port number as a destination port number;

a processing element (CPU) for replacing the network address of the gateway in the message with the network address of the terminal device and for replacing said first port number in said message with the second port number, on the basis of said correlation;

a short-range radio-frequency transceiver for transmitting the message from the gateway to the terminal device of the short-range communication network via a short-range radio link, the message having the network address of the terminal device as a receiver's address and said second port number as a destination port number.

35. Software executable at a gateway for transmitting a message from a wireless radio-frequency short-range communication network via the gateway to a network external to the short-range communication network, the software comprising:

program code for causing the gateway to receive a first message at the gateway via a short-range radio link from a terminal device of the short-range communication network, the first message being addressed to an element external to the short-range communication network and the first message comprising a network address of said terminal device as a transmitter's address and a first port number as a source port number, the network address of the terminal device being a network address used inside the short-range communication network, wherein the software comprises:

program code for allocating a second port number to the terminal device;

program code for replacing the network address of said terminal device in the first message with the network address of the gateway and for replacing the first port number in the first message with the second port number;

program code for generating a correlation between the network address of the terminal device, the first port number and the second port number and storing it in a memory available to the gateway for identifying the terminal device;

program code for causing the terminal device to transmit the message from the gateway to the element external to the short-range communication network, the first message having the network address of the gateway as a transmitter's address and said second port number as a source port number.

36. Software executable at a gateway for transmitting a message from an element external to a wireless short-range radio-frequency communication network via the gateway to a terminal device of the short-range communication network, wherein the software comprises:

program code for selecting a first port number for the terminal device;

program code for generating a correlation between the network address of the terminal device, said first port number and a particular second port number and for storing it in advance in a memory available to the gate-way, the network address of the terminal device being a network address used inside the short-range communication network, and said second port number being intended to identify the right application in the terminal device;

program code for causing the gateway to receive a message at the gateway from the element external to the short-range communication network, the message comprising the network address of the gateway as a receiver's address and said first port number as a destination port number;

program code for replacing the network address of the gateway in said message with the network address of the terminal device and for replacing said first port number in said message with the second port number, on the basis of said correlation;

program code for causing the gateway to transmit the message from the gateway to the terminal device in the short-range communication network via a short-range radio link the message having the network address of the terminal device as a receiver's address and said second port number as a destination port number.

* * * * *